June 16, 1964    S. C. HERBINE ET AL    3,137,005

SAFETY CAP WITH ATTACHMENT MOUNTING A SHIELD THEREON

Filed May 29, 1961

INVENTORS.
Stanley C. Herbine
William R. Bohner

BY
William J. Ruano
their ATTORNEY

3,137,005
SAFETY CAP WITH ATTACHMENT MOUNTING A SHIELD THEREON

Stanley C. Herbine, Wyomissing, and William R. Bohner, Reading, Pa., assignors to The Electric Storage Battery Company, Philadelphia, Pa.
Filed May 29, 1961, Ser. No. 126,378
1 Claim. (Cl. 2—10)

This invention relates to a detachable welding shield (or face shield) and safety cap combination and, more particularly, to a detachable connection therebetween which enables the welder, by the use of even one hand, to either attach the welding shield or to detach it from the safety cap so that he may use his other hand for holding a welding electrode holder or other equipment. This invention is an improvement over that shown in our Patent 2,963,708 issued December 13, 1960.

The combination of a welding shield and safety cap is known in the art, however, one outstanding disadvantage of such combination as conventionally used has been that the welding shield is fastened to the helmet by fastening means, such as screws and the like, which involves a certain amount of difficulty and the use of both hands for either attaching the welding shield to the safety cap or detaching it therefrom, as well as requiring appreciable time for such connection or disconnection. This is undesirable because the welder usually has frequent necessity of removing the shield or attaching it to the safety cap during intermittent welding operations. Therefore, in the conventional combination it would be necessary for him to lay down the welding torch and then use both hands for applying the screws or other fastening elements for attaching the welding shield to the helmet. Because of this inconvenience, many times the shield is not worn when it should be, therefore exposing the workman to danger.

Our prior patent, referred to above, shows a headband which is contracted by a spring and thereby held onto the headband portion of a safety cap as the sole means for detachably connecting the headband to the safety cap. A pin is attached to the rear end of the safety cap to serve as a limit stop for preventing upward riding movement of the headband relative to the cap. However, an outstanding disadvantage is that it is necessary to drill a hole through the cap to permit installation of the pin or other suitable stop means. Moreover, the pin holds down the headband at only one point namely, at the rear of the cap, which is generally insufficient, and in some cases, also at the front of the cap, but the latter would have the disadvantage of requiring the drilling of another hole in the front of the cap.

An object of the present invention is to provide a means for latching and holding the spring biased headband in proper position on the cap without the necessity of drilling holes for the attachment of pins or other stop elements in the cap.

A more specific object of the invention is to provide, in a face protective element and safety cap assembly, a spring held headband having hooks which may be bent and sprung apart from unlatching position with the bottom edge of the cap to effect removal, or which, upon mounting of the headband, will automatically bend and spring into latching position so as to firmly hold down the headband and prevent detachment or upwardly sliding of the headband on the cap.

Other objects and advantages of the present invention will become apparent from a study of the following description taken with the accompanying drawing wherein.

Figure 1:
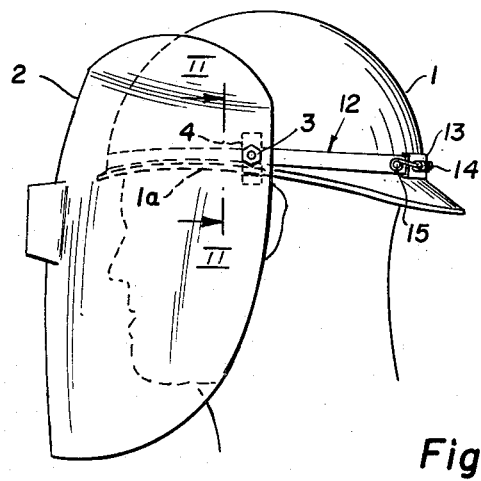
FIG. 1 is a side, elevational view showing a safety cap and welding shield combination embodying the readily attachable and detachable connecting means in accordance with the principles of the present invention.
Figure 4:
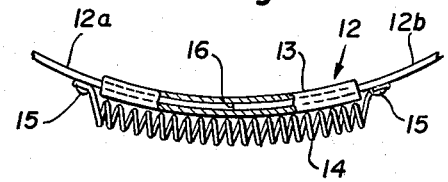
Figure 2:
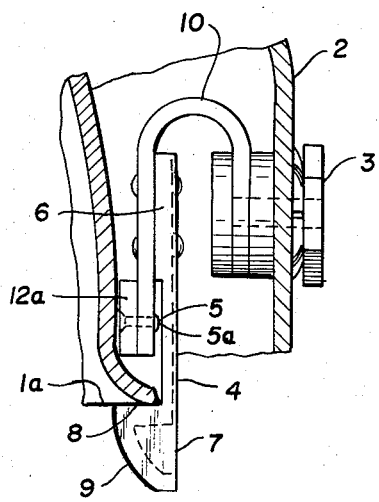
FIG. 2 is an enlarged, cross-sectional view taken along line 2—2 of FIG. 1.
Figure 3:
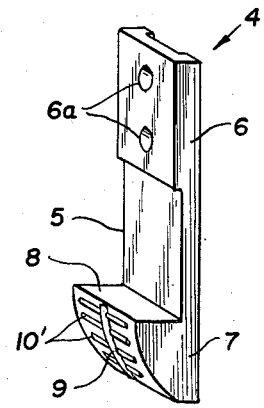

FIG. 3 is an enlarged, perspective view of one of the hooks 4, shown in FIGS. 1 and 2, and located on diametrically opposite sides of the headband 12; and, FIG. 4 is an enlarged, fragmentary portion, showing the rear end of the headband assembly, with the tubular portion shown partly broken away for purposes of better illustration of the interior construction.

Referring more particularly to the drawing, numeral 1 denotes a safety cap or hat of any well-known type, such as a plastic or metal cap or hat having only a rear brim portion.

A welding shield 2 of any conventional type is shown including the well-known window portion through which the welder is able to view objects as they are welded. The shield 2 is attached, by means of a pair of leaf springs 10 of inverted, substantially U-shape, to diametrically opposite portions of a headband 12, preferably of plastic material. One leg of each spring 10 is secured, by means of a pivot, to the shield, such pivot means including a conventional bolt and a "speed nut" type of leaf spring washer so as to enable adjustment of the tension of the spring washer by turning of hexagonal part 3 to enable holding the shield 2 at preselected angles of tilt with respect to cap 1. The opposite legs of leaf spring 10 are connected by rivets 5a or other suitable fastening means to two diametrically opposite portions of the headband 12 and to the top portion 6 of hooks 4, as shown more clearly in FIG. 3, by rivets or other fastening means extending through holes 6a.

Hooks 4 preferably made of slightly flexible material to permit sufficient bending thereof by manual force applied to hook portions 7 to assure unlatching from the bottom edge 1a of cap 1. Hooks 4 are preferably made of nylon and may be provided with ribs 10' and a central groove 9 to provide greater friction with the thumbs when the wearer grasps hook portions 7 and pulls them apart to effect unlatching. The hooks are undercut at 5 to provide sufficient clearance for the heads of rivets 5a. The hooked end portion 7 is provided with a ledge 8 which latches the bottom edge 1a of the cap.

The ends of headband portions 12a and 12b are abutting at 16 and are enclosed within a tubular element 13, or one of substantially U-shaped cross-section, as shown in FIG. 4. The purpose of element 13 is not only to surround the abutting ends of the headband 12, but to serve as a back rest for a helical spring 14 whose ends are connected to rivets 15 or other suitable fastening means which are fastened to the respective portions 12a and 12b of the headband 12.

Helical spring 14 is always under tension, therefore yieldingly urges the end portions 12a and 12b of the headband in contacting relationship so that the headband 12 tightly and yieldingly embraces the safety cap 1.

Instead of relying upon contacting of the end of the headband to limit the extent of contraction of the headband, rivets 15 may be used as stop members which engage the ends of tube 13 while the ends of headband portions 12a and 12b are separated within tube 13.

In operation, since the headband 12 is held against the band portion of the cap 1 merely by the tension of spring 14, whenever it is necessary to remove the welding shield 2, the welder merely springs apart brim hooks 4, successively, so as to become unlatched from the bottom 1a of the cap, each time slightly lifting the shield, then grasps the shield with one hand and lifts it, and in so doing the headband 12 is easily removed from engagement with the safety cap. Then when the welder desires to again replace the welding shield or to attach it to the cap, he simply grasps the shield with one hand and lowers the headband on the crown portion of the cap, forcing the headband 12 downwardly into its proper position, that is, surrounding the band portion of the cap, so as to tightly grasp such portion and hold the shield in place, whereupon hooks 4 will be automatically sprung into the latching position as shown in FIG. 2. The brim portion 1a generally serves as a limit stop for lowering movements of the headband 12, the extent of which lowering movements is finally determined by the distance from ledge 8 of hook 4. It will be particularly noted that there are no screws or other fastening means that require the use of two hands for making a connection between the headband 12 and the cap, and, instead, the connection is merely a spring under tension which may be either made or broken by the use of one hand of the welder so as to enable the welder's other hand to be free to hold a welding torch or other equipment.

While the present invention has been described in connection with a welding shield, it is equally suitable for mounting any other face protective element, such as a face shield or goggles, on a safety cap or hat, or an ear protector.

Moreover, while hooks 4 are described as being preferably of flexible plastic material they may, in some instances, be made of rigid plastic or metal since leaf springs 10 may bend sufficiently to assure latching and unlatching of hooks 4.

Thus it will be seen that we have provided an efficient safety shield and safety cap combination which allows the shield to be easily and quickly attached to the cap or detached therefrom by the simple lifting and lowering movement by one hand of the welder; furthermore, we have provided a yieldable spring connection for clamping a headband attachment of the welding shield to the band portion of the cap, whereby the welder may very rapidly and easliy attach the shield to the cap when he wants to weld, and detach it therefrom when the welding operation is completed, therefore greatly speeding up production and encouraging wearing of the welding shield at all times when safety precautions demand it.

While we have illustrated and described a single specific embodiment of our invention, it will be understood that this is by way of illustration only, and that various changes and modifications may be made within the contemplation of our invention and within the scope of the following claim.

We claim:

In combination with a safety headgear having a band portion and an adjoining, outwardly flared brim portion having a bottom edge, a headband, a face protecting shield having a pair of spring clips of inverted U-shape attached to opposite sides of the inner surface of said shield and to opposite side portions of said headband, said headband comprising spring means for yieldably holding said headband in contracted relationship, a pair of hooks having flexible shank portions secured to said clips and having downwardly and inwardly extending hook portions at the ends of said shank portions in confronting relationship and extending below said bottom edge and constituting the sole means to hold said headband downwardly, whereby the headband is clamped onto the headgear solely by the tension of said spring means and held tightly thereto by latching of said hook portions to said bottom edge of the headgear brim portion, so that the welder may, by springing apart said hook portions, flex said shank portions sufficiently to enable said hook portions to clear said bottom edge and detach the headband and shield from said safety headgear, said brim portion serving as a stop to limit downward movement of said headband.

References Cited in the file of this patent

UNITED STATES PATENTS

| | | |
|---|---|---|
| 2,738,508 | Cairns | Mar. 20, 1956 |
| 2,759,188 | Maillart | Aug. 21, 1956 |
| 2,834,017 | Simpson et al. | May 13, 1958 |
| 2,904,790 | Ruggiero | Sept. 22, 1959 |
| 2,963,708 | Herbine et al. | Dec. 13, 1960 |
| 3,060,444 | Hoffmaster et al. | Oct. 30, 1962 |